(12) United States Patent
Bosqueiro et al.

(10) Patent No.: US 8,490,923 B2
(45) Date of Patent: Jul. 23, 2013

(54) PORTABLE ONBOARD VEHICULAR HOIST SYSTEMS

(75) Inventors: Thiago de Almeida Bosqueiro, São José dos Campos (BR); Gustavo Aparecido de Lima Moreira, São José dos Campos (BR); Vinícius Visacro, Belo Horizonte (BR)

(73) Assignee: Embraer S.A., São Josédos Campos, SP (BR)

( * ) Notice: Subject to any disclaimer, the term of this patent is extended or adjusted under 35 U.S.C. 154(b) by 554 days.

(21) Appl. No.: 12/645,445

(22) Filed: Dec. 22, 2009

(65) Prior Publication Data

US 2011/0147531 A1 Jun. 23, 2011

(51) Int. Cl.
 *B64C 1/22* (2006.01)
 *B64D 1/22* (2006.01)
 *B64D 9/00* (2006.01)

(52) U.S. Cl.
 USPC ........ 244/137.1; 212/180; 212/181; 414/540; 414/589; 414/591

(58) Field of Classification Search
 USPC .............. 244/137.1; 212/180, 181, 179, 312, 212/313, 324, 76, 97, 336, 271; 414/540, 414/589, 591
 See application file for complete search history.

(56) References Cited

U.S. PATENT DOCUMENTS

| | | | | |
|---|---|---|---|---|
| 1,673,307 A * | 6/1928 | Best | ............................... | 254/323 |
| 3,088,608 A * | 5/1963 | Theodore | ...................... | 414/549 |
| 3,552,587 A | 1/1971 | Warren | | |
| 3,888,463 A * | 6/1975 | O'Brien et al. | ............. | 254/10 C |
| 4,252,491 A * | 2/1981 | Hock | ............................. | 414/540 |
| 4,858,855 A * | 8/1989 | Dalbera | ..................... | 244/137.1 |
| 5,862,926 A * | 1/1999 | Johnson | ........................ | 212/180 |
| 6,499,610 B2 | 12/2002 | Spitsbergen | | |

* cited by examiner

*Primary Examiner* — Philip J Bonzell
(74) *Attorney, Agent, or Firm* — Nixon & Vanderhye P.C.

(57) ABSTRACT

Portable vehicular hoist systems include a truss assembly having a joist member with forward and rearward ends, a pair of rafter members each having upper and lower ends, and a forward connection assembly for connecting the upper ends of the rafter members to the forward end of the joist member to allow for relative pivotal articulated movements therebetween. The rafter members may thus be pivotally moved between a stowed condition wherein the rafter members are oriented generally parallel to the joist member and an operative position wherein the rafter members extend downwardly and laterally outwardly from the joist member. A hoist assembly may be provided so as to be connectable to the joist member of the truss assembly to be supported thereby. The rearward end of the joist member and the lower ends of the rafter members may be removably attached to respective connection lugs rigidly fixed to a vehicle's structure, e.g., an aircraft fuselage at an opening therein.

9 Claims, 7 Drawing Sheets

PORTABLE ONBOARD VEHICULAR HOIST SYSTEMS

FIELD

The disclosed embodiments herein relate to onboard vehicular hoist systems especially adapted for use in the loading and unloading of cargo, baggage, equipment and like material into and out of an aircraft fuselage, respectively. In especially preferred embodiments, the portable onboard hoist systems may be removably associated with an aircraft so as to assist in the loading and unloading cargo and the like therefrom.

BACKGROUND

As is well known, it is typically necessary for relative heavy cargo, baggage, equipment and like material (hereinafter more simply referred to collectively as "cargo") to be loaded and unloaded from the interior of an aircraft fuselage. In order to accomplish this task, there is sometimes provided ground-based cargo handling equipment, including hoists, which will assist an aircraft operator in the loading/unloading of cargo. However, there also exists a need for the aircraft to be provided with onboard cargo handling equipment in the event that ground-based equipment is unavailable (e.g., that may occur in remote airport facilities and/or landing sites).

Several onboard hoist systems are known in the art as exemplified by U.S. Pat. No. 3,552,587 to Warren, U.S. Pat. No. 4,858,855 to Dalbera, and U.S. Pat. No. 6,496,610 to Spitsbergen, the entire contents of each being expressly incorporated hereinto by reference. In this regard, the Warren '587 patent discloses a cargo handling system to place cargo load support elements in a fuselage of an aircraft and comprises a hoist mechanism supported by retractable support rails attached to the aircraft fuselage. The system according to Warren '587 is adapted to automatically place the load support elements within or remove the load support elements from the aircraft fuselage. The Warren '587 system is not portable and is relatively heavy and structurally complex.

The autonomous onboard loading system proposed by Dalbera '855 includes a hoisting means movable between the exterior and interior of the aircraft fuselage along carrier and guide means. The proposed guide means comprise transverse rails inside the fuselage at the level of the upper part of the lateral opening and two arms provided with rails movable between an extended position, wherein the arms extend outside the fuselage, and a retracted position, wherein the arms are withdrawn into the fuselage. Since the hoist system of Dalbera '855 is permanently fixed to the aircraft fuselage structure, it is not portable.

A portable hoist system is proposed by Spitsbergen '610 and comprises a hoist support assembly slidably mounted over a vertically oriented pintle fixed to the vehicle's structure. The hoist support assembly includes a substantially vertical tube which is connected at its top portion to a support arm, the latter being supported with respect to the former by means of an angled brace member. A lifting strap control assembly including a windlass and a guide bat are provided so as to lift loads. While the system proposed by Spitsbergen '610 is portable, the rather large pintle that is required for connected support with the vehicle is not entirely advantageous for use with an aircraft fuselage.

It would therefore be especially desirable to provide vehicular hoist systems especially adapted for use in the loading and unloading of cargo, baggage, equipment and like material into and out of a vehicle, especially an aircraft fuselage, which addresses the disadvantages noted above. It is towards fulfilling such needs that the present invention is directed.

SUMMARY OF EXEMPLARY EMBODIMENTS

Portable vehicular hoist systems according to preferred embodiments comprise a truss assembly which includes a joist member having forward and rearward ends, a pair of rafter members each having upper and lower ends, and a forward connection assembly for connecting the upper ends of the rafter members to the forward end of the joist member to allow for relative pivotal articulated movements therebetween. As such, the rafter members may be pivotally moved between a stowed condition wherein the rafter members are oriented generally parallel to the joist member and an operative position wherein the rafter members extend downwardly and laterally outwardly from the joist member. A hoist assembly is also preferably provided so as to be connectable to the joist member of the truss assembly to be supported thereby. The hoist assembly is sized and configured so as to be capable lifting and dropping loads as may be anticipated during use.

According to some embodiments, the forward connection assembly will preferably comprise a connection yoke positioned substantially transverse to the joist member, and a connection pin which connects the forward end of the joist member to the connection yoke for relative pivotal movements therebetween. The forward end of the joist member may include a forward connection tongue, and the connection yoke may include an elongate slot for receiving the forward connection tongue therein. A connection pin may therefore be provided so as to connect the connection yoke to the forward connection tongue received within the elongate slot thereof.

In a similar manner, certain preferred embodiments will also include upper connection tongues respectively provided with the upper ends of the rafter members. The forward connection yoke may therefore comprise an opposed pair of slotted support ears for receiving a respective one of the upper connection tongues of the rafter members. Connection pins may be provided for pivotally coupling the slotted support ears to the respective one of the upper connection tongues.

A carriage assembly moveably coupled to the joist member for reciprocal rectilinear translations relative thereto may be provided according to certain embodiments of the invention. In this regard, the carriage assembly may comprise a carriage yoke having a pair of laterally spaced apart yoke arms, a roller journally coupled to and extending between the yoke arms above the joist member, and a carriage lug depending from the yoke arms. The carriage lug may include an aperture to allow for attachment of the hoist assembly.

The portable hoist systems of the present invention may be employed with virtually any vehicle. In especially preferred embodiments, the hoist systems may be operatively associated with an aircraft having a fuselage, an opening in the fuselage, an upper connection lug rigidly fixed to an upper region of the fuselage opening, and a pair of side connection lugs rigidly fixed to respective lateral regions of the fuselage opening. A portable hoist system having a joist member and a pair of rafter members as described briefly above may therefore be connected to the upper and side connection lugs. Quick release pins may thus be provided so as to removably connect the rearward end of the joist member and/or the lower ends of the rafter members to their respective connection lug.

The hoist systems may be provided as a kit which comprises a case defining an interior space for containing the various components associated with the hoist systems during periods of non-use. In certain preferred embodiments, the case may include various internal dividers that will establish interior spaces therewithin for containing the hoist system components. In addition, various other auxiliary equipment may be provided within the case for use with the hoist system, for example, a frequency converter that converts input voltage from a source to the voltage required by the hoist motor associated with the hoist assembly. The various components may be protected within the case by conventional packing foam, tie down straps or the like to minimize movement of the components physically within the case and thereby minimize damage that may ensue from such movement.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
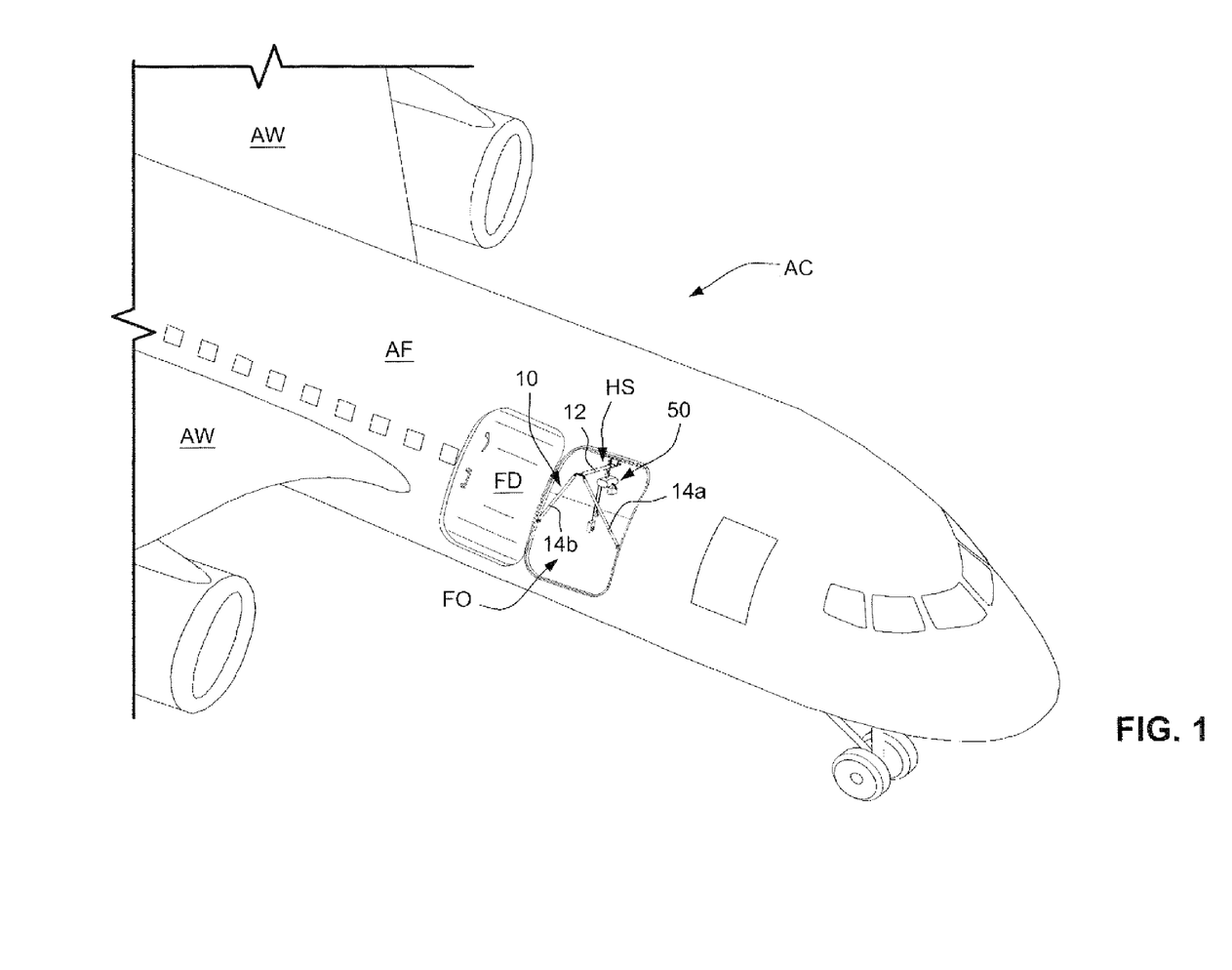
FIG. 1 is partial schematic perspective view of an aircraft equipped with a portable hoist system in accordance with a presently preferred embodiment according to the present invention.
Figure 2:
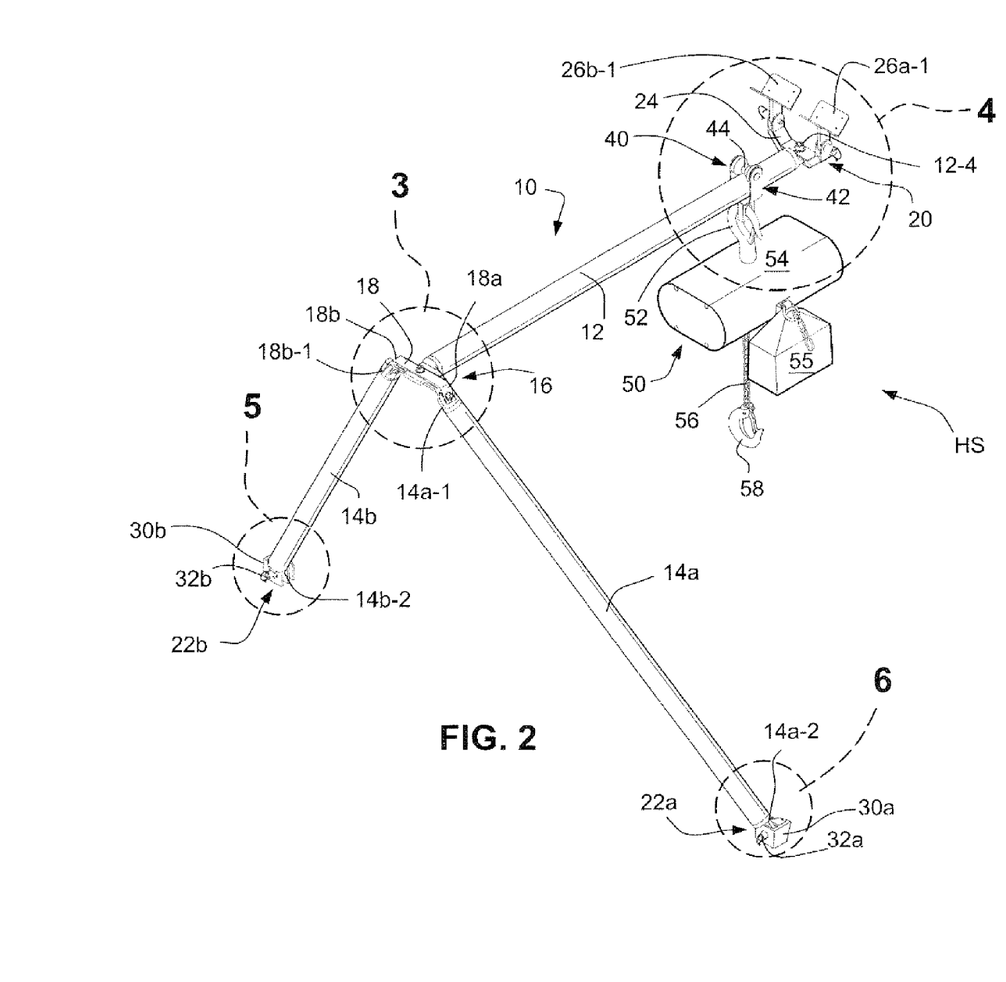
FIG. 2 is an enlarged perspective view of the hoist system depicted in FIG. 1.

Accompanying FIG. 1 depicts schematically an aircraft AC having an opening FO on a side of the aircraft's fuselage AF. As is conventional, the opening may be closed for flight operations by means of a door FD hinged to the fuselage AF. A hoist system HS in accordance with an embodiment of the present invention is shown as being deployed in the opening FO in order to assist in the loading and unloading of cargo into the interior of the aircraft fuselage AF. Although the opening FO is depicted as being forward of the aircrafts wings AW, it should be appreciated that the hoist system HS may be employed in virtually any opening of the fuselage, e.g., behind, under or over the wings AW.

The hoist system HS is depicted in somewhat greater detail in accompanying FIGS. 2-6. In this regard, the hoist system HS is generally comprised of a truss assembly 10, and a hoist assembly 50. The truss assembly 10 is provided with a joist member 12 and a pair of rafter members 14a, 14b.

The forward end of the joist member 12 and the upper ends of the rafter members 14a, 14b are connected to one another at a junction node by means of an articulated connection assembly 16. As is perhaps more clearly depicted in FIG. 3, the connection assembly 16 is generally comprised of a forward connection yoke 18 positioned substantially transverse to the joist member 12. The connection yoke 18 most preferably includes downwardly and outwardly angled slotted support ears 18a, 18b at each opposed end thereof. The connection yoke 18 also defines an elongate central slot 18c which receives a forward substantially planar connection tongue 12-1 projecting outwardly from the joist member 12. A connection pin 12-2 serves to connect the tongue 12-1 to the forward connection yoke 18 so as to allow for pivotal movements therebetween about axis $A_1$.

Figure 3:
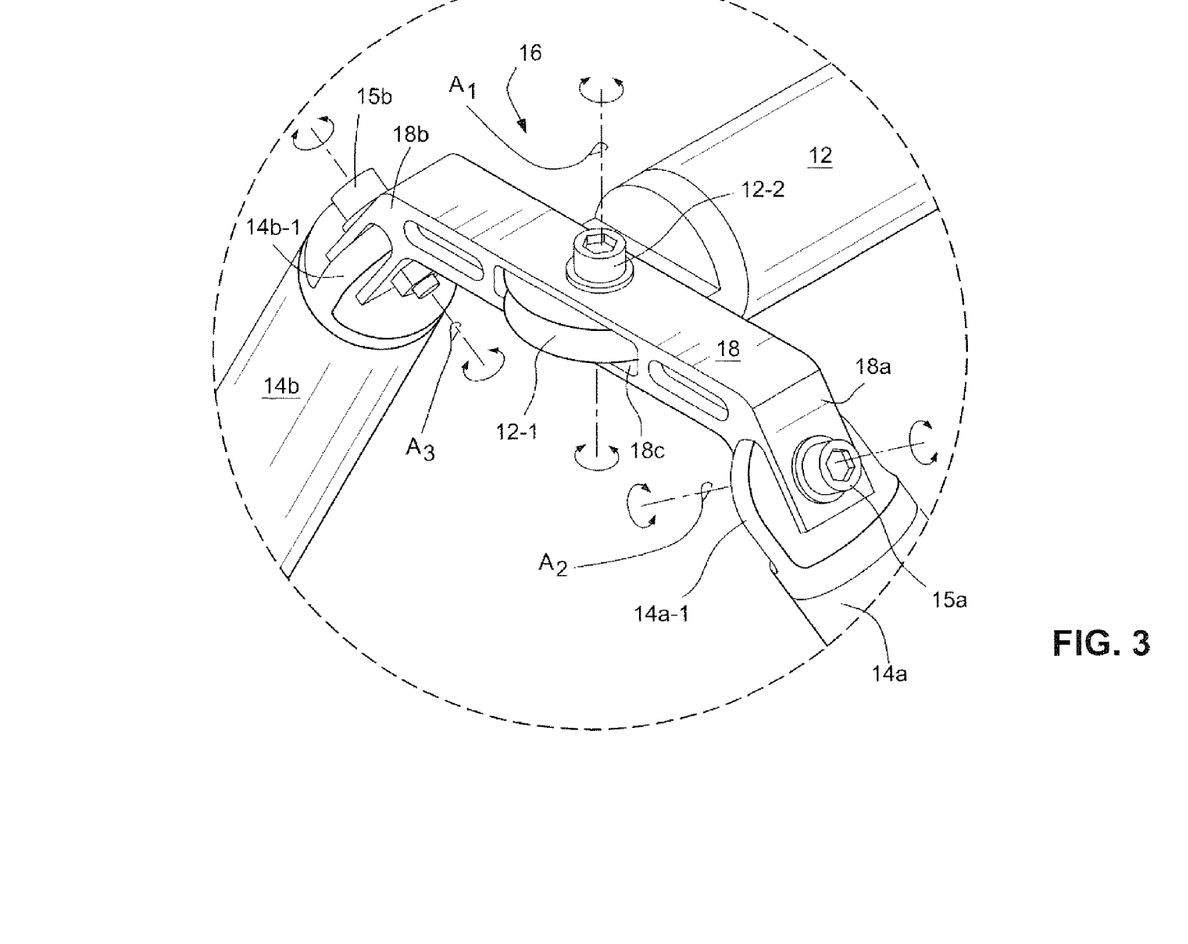
FIGS. 3-6 are enlarged perspective views of the subassemblies associated with the hoist system as shown in FIG. 2.

The upper ends of the rafter members 14a, 14b are provided with upper substantially planar connection tongues 14a-1, 14b-1 that are received by the slotted support ears 18a, 18b, respectively. Connection pins 15a, 15b connect each of the tongues 14a-1, 14b-1 to a slotted support ear 18a, 18b for relative pivotal movements therebetween about axes $A_2$ and $A_3$, respectively.

Figure 4:
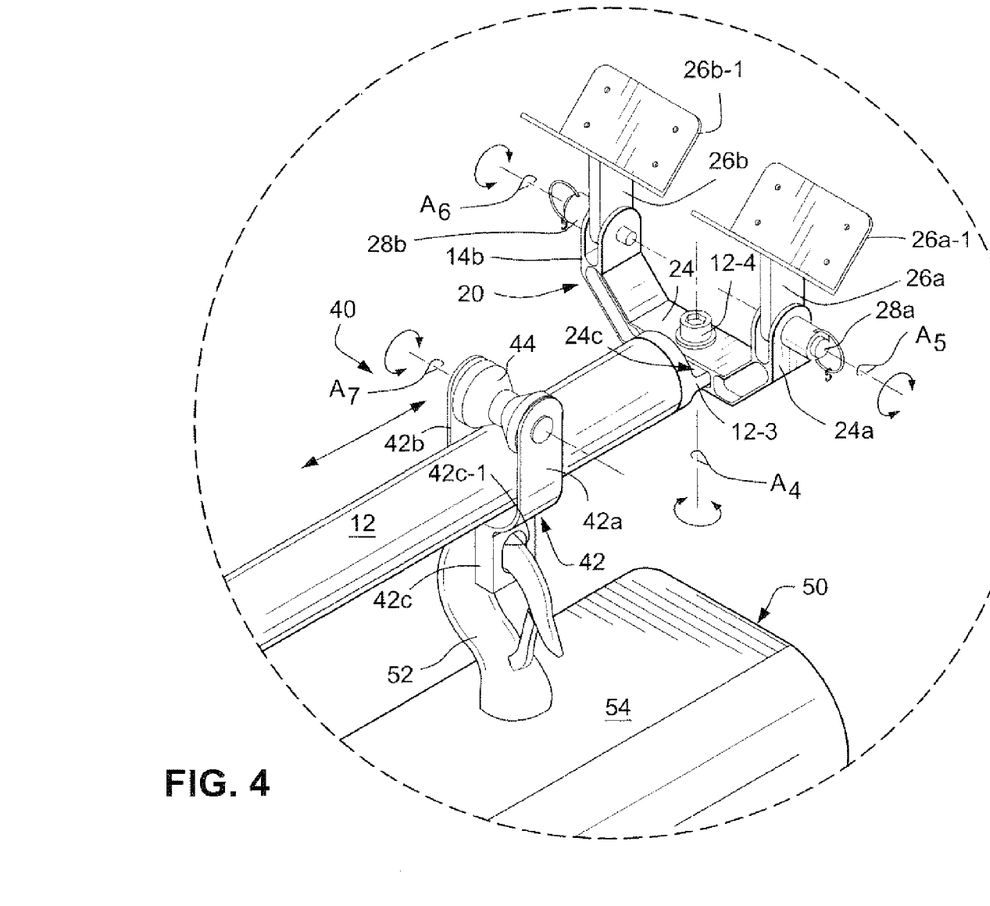
Figure 5:
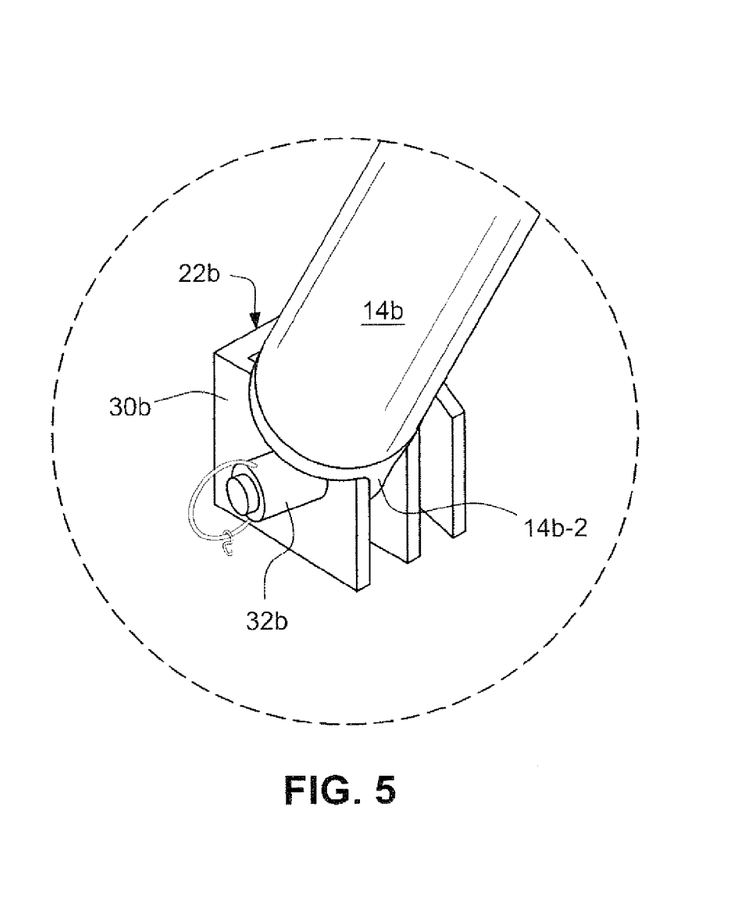
Figure 6:
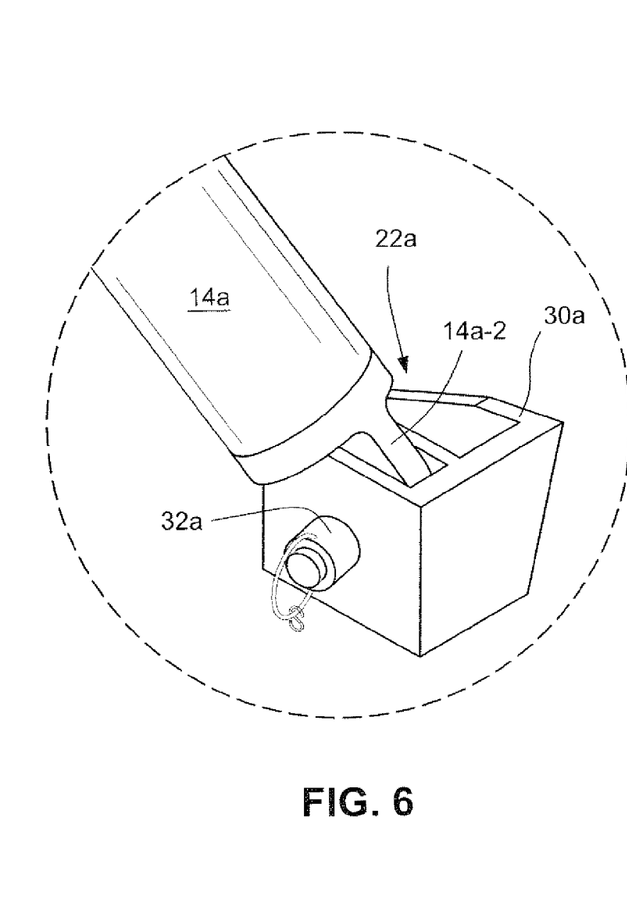

The rearward end of the joist member 12 is provided with a rearward connection assembly 20 while the lower ends of the rafter members 14a, 14b are provided with connection assemblies 22a, 22b, respectively. As shown in FIG. 4, the rearward connection assembly 20 is provided with a rearward connection yoke 24 having upwardly oriented slotted support ears 24a, 24b at each opposed end thereof. The connection yoke 24 also defines an elongate central slot 24c which receives a rearward substantially planar connection tongue 12-3 projecting outwardly from the joist member 12. A connection pin 12-4 serves to connect the tongue 12-3 to the rearward connection yoke 24 so as to allow for pivotal movements therebetween about axis $A_4$.

The slotted support ears 24a, 24b of the rearward connection yoke 24 are adapted to being removably coupled to the downwardly projecting upper lugs 26a, 26b by means of quick release pins 28a, 28b, respectively. The rearward connection yoke 24, and hence the joist member 12, is therefore permitted some degree of pivotal movement relative to the lugs 26a, 26b about the axes $A_5$, $A_6$ established by the quick release pins 28a, 28b, respectively. The lugs 26a, 26b have attachment flanges 26a-1, 26b-1, respectively, which allow the lugs 26a, 26b to be immovably and rigidly fixed to the aircraft fuselage AF structure (e.g., via rivets, bolts, welding or the like) near an upper region of the opening FO.

The lower connection tongues 14a-2, 14b-2 associated with the rafter members 14a, 14b are similarly adapted to being removably coupled to side lugs 30a, 30b by means of quick release pins 32a, 32b, respectively. The side lugs 30a, 30b are adapted to being immovably and rigidly fixed to the aircraft fuselage AF structure (e.g., via rivets, bolts, welding or the like) near respective opposed lateral side regions of the opening FO.

Although the forward connection tongue 12-1 of the joist member 12 and the upper connection tongues 14a-1, 14b-1 of the rafter members 14 are have been depicted and described in relation to the presently preferred embodiment as maintaining the joist member 12 and rafter members 14a, 14b in a connected but relatively pivotally movable state, it is entirely conceivable that such component structures could be provided with quick release pins similar to pins 28a, 28b and 32a, 32b instead of the pins 12-2 and 15a, 15b. In such an alternatively, the joist member 12 and rafter members 14a, 14b would thus be maintained in an unconnected state from one another and assembled via the quick disconnect pins when an operator desires to deploy the hoist system HS.

The joist 12 includes a reciprocally movable carriage assembly 40 for dependently supporting the hoist assembly 50 and the load carried thereby. In this regard, the carriage assembly 40 includes a carriage yoke 42 having a pair of upwardly oriented and laterally spaced apart yoke arms 42a, 42b and a downwardly oriented carriage lug 42c depending therefrom. A center tapered roller 44 is journeled to and spans between the upper ends of the carriage yoke arms 42a, 42b above the joist member 12. The journaling of the roller 44 to the yoke arms 42a, 42b thus allows for journeled movement of the roller 44 about shaft axis $A_7$ and thus reciprocal rectilinear rolling movement of the carriage assembly 40 along the length of the joist member 12. The carriage lug 42c includes an aperture 42c-1 to permit attachment of the hoist assembly 50 (e.g., via its attachment hook 52). As such, loads supported by the joist member 12 via the hoist assembly 50 may be moved the length of the former by virtue of the rolling movement of the carriage assembly 40.

Figures 7, 8:
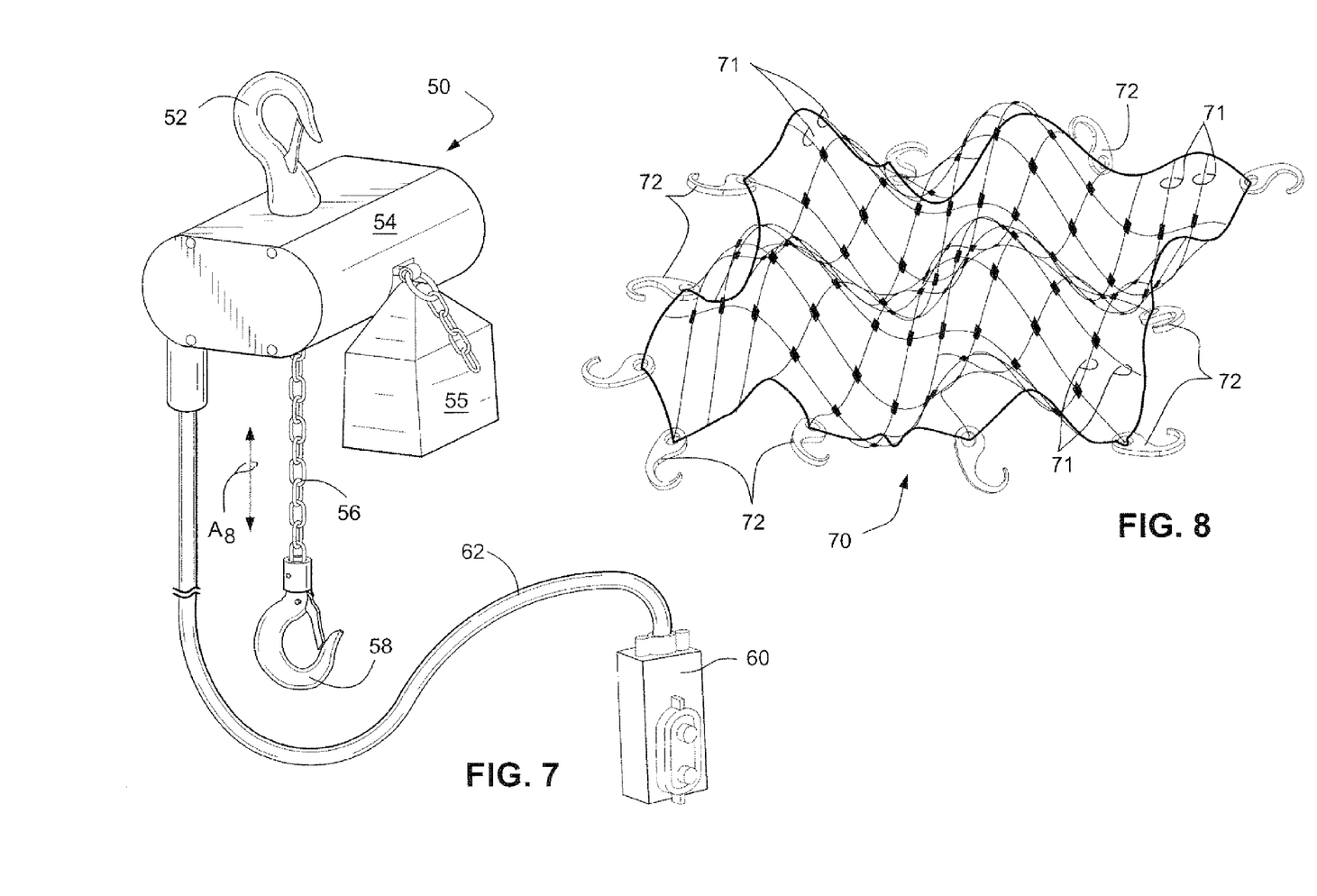
FIG. 7 is an enlarged schematic perspective view of a chain hoist subassembly that may be employed with the hoist system.
FIG. 8 is a schematic perspective view of a cargo net subassembly that may be employed with the hoist system.

Virtually any conventional hoist assembly 50 may be employed satisfactorily with the truss assembly 10 described above. Thus, manual, electric and pneumatic hoist assemblies may be employed. The hoist assembly 50 as depicted in FIG. 7 is a self-contained electric hoist having a hoist hook 52 attached to and extending upwardly from a hoist body 54. The hoist body 54 contains a reversible electric hoist motor (not shown) of adequate capacity for the contemplated loads and may be powered by the aircraft's onboard DC electrical power or by AC electrical power provided by an onboard or externally supplied generator (e.g., a conventional power cart). By way of example only, the hoist motor may be powered by an external rechargeable batter within container 55. A flexible lift strap 56 which in the embodiment shown is in the form of a chain, is dependently supported by the hoist body 54 and operably connected to the reversible motor (not shown) so that operation of the motor will either lift or drop the lift hook 58 (arrow $A_8$) at the terminal end of the lift strap 56. Direction control of the motor and hence the lift hook 58 is achieved by means of the hand-held controller 60 which is connected operably to the motor by means of suitable electrical control cables 62.

The lift hook 58 may be connected directly to a load (not shown) for manipulation. Alternatively, a cargo net 70 may be provided as depicted in accompanying FIG. 8. The exemplary cargo net 70 is in and of itself conventional in that it is constructed of strong and preferably lightweight cords 71 which are preferably made from synthetic material, e.g., polyolefin, nylon or the like filaments. The cords 71 are formed into a net structure by joining adjacent ones of the cords at their crossing points (e.g., by knotting, material fusion, crimping and the like). A number of net hooks (an exemplary few of which are identified by reference numeral 72) are positioned about the periphery of the net 70 so as to allow the net 70 to be gathered together and connected to the lift hook 58 of the hoist assembly 50. In such a manner, the net 70 will form a basket structure that will allow objects to be manipulated by the hoist assembly 50 in the manner described.

Figure 9:
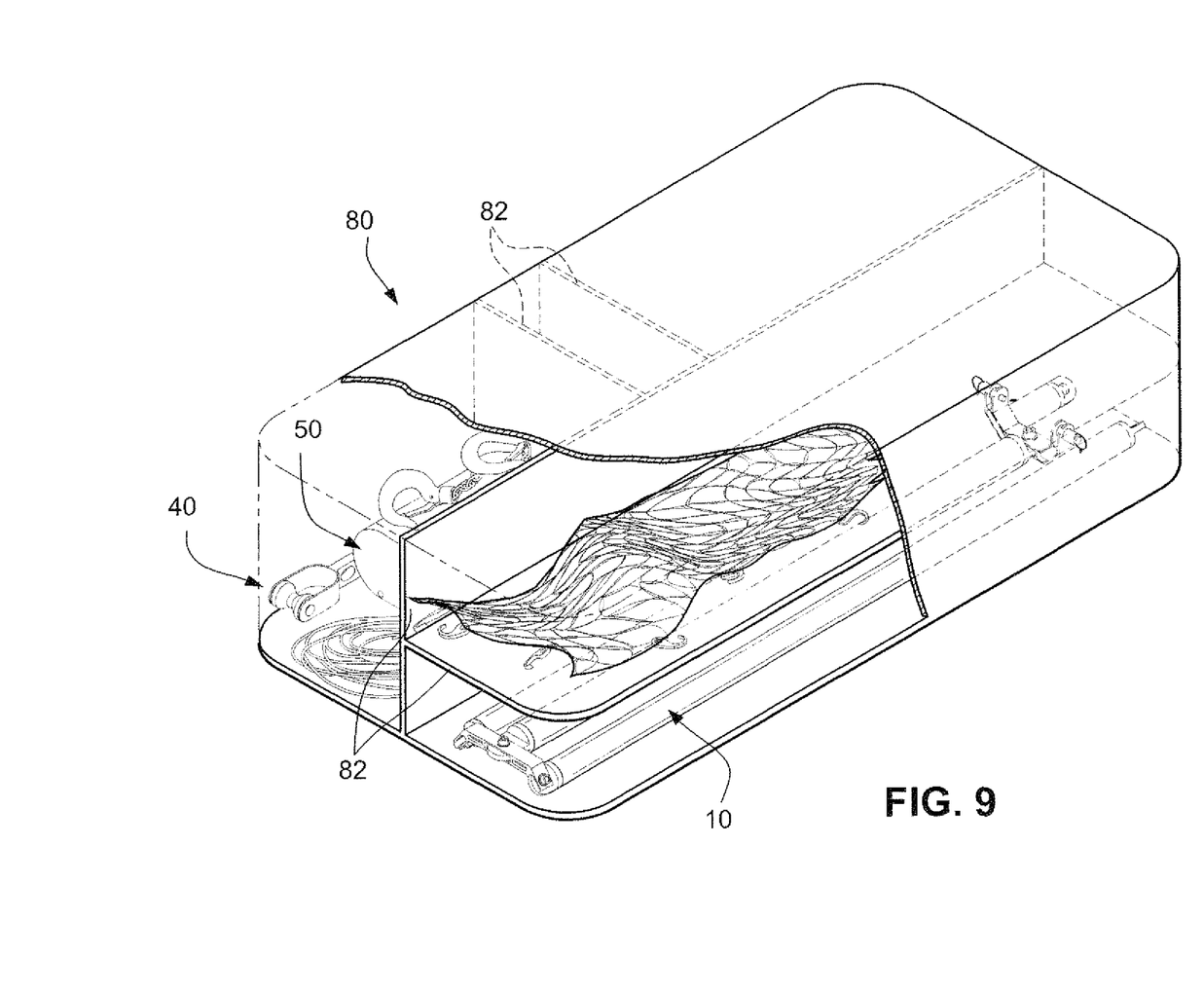
FIG. 9 is a partial cross-sectional perspective view of a portable storage unit that can provide storage for the components and subassemblies of the hoist system as depicted in FIGS. 1-8.

As noted previously, the hoist system HS is both portable (i.e., capable of being moved physically from one location to another within the aircraft AC and/or from one aircraft to another). In order to facilitate such portability of the hoist system HS, its various components are most preferable stowed in kit form within a suitable case 80 as depicted in FIG. 9. The case 80 will include various internal dividers 82 that will establish interior spaces therewithin for containing the hoist system HS components described previously. In addition, various other auxiliary equipment may be provided within the case 80 for use with the hoist system, for example, a frequency converter (not shown) that converts input voltage from a source to the voltage required by the hoist motor associated with the hoist assembly 50 (e.g., converting 220 VAC to 120 VAC and/or converting 120 VAC to 12 VDC). The various components may be protected within the case 80 by conventional packing foam, tie down straps or the like to minimize movement of the components physically within the case 80 and thereby minimize damage that may ensue from such movement.

In use, the lugs 26a, 26b and 30a, 30b will be prepositioned and rigidly fixed to the fuselage structure at the fuselage opening FO of the aircraft AC prior to the hoist system being deployed. Once the lugs 26a, 26b and 30a, 30b have been fixed to the aircraft AC at the opening FO, the hoist system HS may be deployed when needed. Thus, the truss assembly 10 may be unpacked from the case 80 and erected by articulating the joist member 12 and rafter members 14a, 14b relative to one another and relative to the lugs 26a, 26b and 30a, 30b.

Once proper alignment has been achieved with the 26a, 26b and 30a, 30b, the pins 28a, 28b and 32a, 32b may be inserted so as to removably but rigidly connect the truss 10 to the aircraft fuselage structure. If the carriage assembly 40 has been removed from the joist member 12, it must first be sleeved over the same prior to connection of the rearward connection assembly 20 to the lugs 26a, 26b by removal and then reattachment of the rearward connection yoke 24 to the joist member 12. However, it is contemplated that the carriage assembly will remain physically sleeved over the joist assembly 12 so as to prevent unneeded disassembly and to make the reassembly of the truss assembly 10 more efficient.

Thereafter, the joist assembly 50 may be coupled to the carriage lug 42c by connection of the hook 52 with the lug aperture 42c-1. The lift hook 58 may thus be connected directly to a load to be moved or to the hooks 72 associated with the cargo net 70 as may be needed. An operator may thus operate the controller 60 to lift or drop loads attached to the lift hook 58 so as to manipulate such loads during cargo loading and/or unloading operations of the aircraft AC.

The removal of the hoist system HS and its stowage is essentially opposite to that described above. That is, once the hoist assembly 50 and cargo net 70 have been removed, the quick release pins 28a, 28b and 32a, 32b may be removed from the lugs 26a, 26b and 30a, 30b so as to free the joist member 12 and the rafter members 14a, 14b, respectively. Thereafter, the joist member 12 and rafter members 14a, 14b may be pivotally articulated with respect to one another so that each such member is generally aligned parallel to one another for stowage within the case 80. The carriage assembly 40 may if desired be removed physically from the joist member 12 by simply rolling it to the rear end thereof once the tongue 12-3 has been disconnected from the rearward connection yoke 24.

The hoist system HS may be employed with a variety of vehicles including for example, trucks, cars, boats and the like. Thus, although the hoist system HS has been depicted as being associated operatively with an aircraft AC, it will be appreciated that such a depiction represents a presently preferred embodiment and is non-limiting with respect to the same.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:
1. A portable vehicular hoist system comprising:
a truss assembly, and a hoist assembly connectable to the truss assembly to be supported thereby and capable lifting and dropping loads, wherein the truss assembly includes, (i) a joist member having forward and rearward ends, and a planar forward connection tongue projecting outwardly from the forward end thereof;

(ii) a pair of rafter members each having upper and lower ends, wherein the rafter members extend downwardly and outwardly relative to one another such that the upper ends thereof have a lesser separation distance relative to one another as compared to the lower ends thereof, and wherein each of the upper ends thereof include a substantially planar upper connection tongue; and (iii) a forward connection assembly which comprises:

(a) a connection yoke positioned substantially transverse to the joist member, (b) outwardly angled slotted support ears formed at each opposed end of the connection yoke for receiving therein a respective planar upper connection tongue of the rafter members so the connection yoke bridges the lesser separation distance between the upper ends of the rafter members, (c) an elongate forward central slot defined by the connection yoke;

(d) a planar joist tongue received within the forward central slot of the connection yoke; and (e) a plurality of connection pins for respectively pivotally connecting the planar joist tongue at the forward end of the joist member to the connection yoke and for pivotally connecting each of the planar upper connection tongues of the rafter members to a respective one of the support ears of the connection yoke in which the upper connection tongue is received to thereby allow for relative pivotal articulated movements therebetween so the rafter members may be pivotally moved rearwardly and upwardly from an operative position wherein the rafter members extend downwardly and outwardly from the connection yoke to a stowed condition wherein the rafter members are oriented generally parallel to the joist member.

2. A portable vehicular hoist system as in claim 1, wherein the rearward end of the joist member includes a rearward connection assembly, and a quick release pin for removably connecting the rearward connection assembly to the upper connection lug.

3. A portable vehicular hoist system as in claim 1, wherein each of the lower ends of the rafter members include a side connection lug, a lower connection tongue, and a quick release pin for removably connecting each of the lower connection tongues to a respective one of the side connection lugs.

4. A portable vehicular hoist system as in claim 1, further comprising a carriage assembly moveably coupled to the joist member for reciprocal rectilinear translations relative thereto.

5. A portable vehicular hoist system as in claim 4, wherein the carriage assembly comprises:

a carriage yoke having a pair of laterally spaced apart yoke arms;

a roller journally coupled to and extending between the yoke arms above the joist member, and a carriage lug depending from the yoke arms.

6. A portable vehicular hoist system as in claim 5, wherein the carriage lug includes an aperture to allow for attachment of the hoist assembly.

7. A portable vehicular hoist system as in claim 1, wherein the truss assembly includes a rearward connection assembly comprising:

a U-shaped rearward connection yoke having upwardly oriented slotted support ears at each opposed end thereof;

an elongate rearward central slot formed in the rearward connection yoke;

a planar rearward tongue member extending from the rearward end of the joist member received within and pivotally connected to the rearward central slot of the rearward connection yoke;

a pair of downwardly projecting upper lugs each being received within and pivotally connected to a respective one of the slotted support ears of the rearward connection yoke.

8. A portable vehicular hoist system as in claim 7, further comprising attachment flanges for immovably fixing the upper lugs to supporting structure.

9. A portable vehicular hoist system as in claim 7, further comprising removable connection pins for pivotally connecting each of the upper lugs to a respective one of the slotted support ears of the rearward connection yoke.

* * * * *